US008159324B2

(12) United States Patent
Zellweger et al.

(10) Patent No.: US 8,159,324 B2
(45) Date of Patent: Apr. 17, 2012

(54) PORTABLE ELECTRONIC DEVICE FOR CONTROLLING AND MANAGING FUNCTIONS AND/OR DATA OF A VEHICLE

(75) Inventors: Emil Zellweger, Lommiswil (CH); Frank Bajahr, Bergish Gladbach (DE); Volker Urban, Gummersbach (DE); Jean-Daniel Etienne, Les Geneveys-sur-Coffrane (CH)

(73) Assignee: Asulab S.A., Marin (CH)

( * ) Notice: Subject to any disclaimer, the term of this patent is extended or adjusted under 35 U.S.C. 154(b) by 888 days.

(21) Appl. No.: 12/091,019

(22) PCT Filed: Oct. 20, 2005

(86) PCT No.: PCT/EP2005/011292
§ 371 (c)(1),
(2), (4) Date: Aug. 11, 2008

(87) PCT Pub. No.: WO2007/045261
PCT Pub. Date: Apr. 26, 2007

(65) Prior Publication Data

US 2008/0309451 A1 Dec. 18, 2008

(51) Int. Cl.
*G05B 23/02* (2006.01)

(52) U.S. Cl. ..................... 340/3.32; 340/3.37; 340/3.71; 340/4.11; 340/12.28; 340/13.24; 340/438; 340/426.35; 340/426.36; 340/426.1

(58) Field of Classification Search ................. 340/3.32, 340/3.7, 3.71, 4.11, 12.28, 13.24, 438, 426.35, 340/426.36, 426.1
See application file for complete search history.

(56) References Cited

U.S. PATENT DOCUMENTS 5,282,028 A * 1/1994 Johnson et al. ............... 725/139
(Continued)

FOREIGN PATENT DOCUMENTS

EP 0 625 738 A1 11/1994
(Continued)

OTHER PUBLICATIONS

International Search Report issued in corresponding application No. PCT/EP2005/011292, completed Jan. 10, 2006 and mailed Feb. 2, 2006.

*Primary Examiner* — George Bugg
*Assistant Examiner* — Paul Obiniyi
(74) *Attorney, Agent, or Firm* — Griffin & Szipl, P.C.

(57) ABSTRACT

The portable electronic device (1) allows functions and/or data of a vehicle to be controlled and managed. In order to do this, the portable device comprises, in a casing having an upper part (10) fixed, for example, in a removable manner on a lower part (11), means for wirelessly transmitting and receiving signals for short range personalised communication with the vehicle. It further comprises a microprocessor unit for processing functions and/or data of the device and of the vehicle, at least one display screen (3) having a portion which is visible from outside the casing for displaying different menus or data of the device or of the vehicle, and manual control means (5, 6) for controlling the execution of functions of the microprocessor unit. A power source, such as a battery, is provided in the casing for supplying electric power to all the electronic components of the device. The manual control means comprise control keys (5) each having a touch-sensitive pad arranged on an inner face of the upper part (10) of the casing. Each control key may be individually activated by a finger of a user placed on the casing in a specified region of the touch-sensitive pad to be activated. The control means further comprise at least one control button (6) which can be pressed, in particular to make the control keys (5) and the display screen (3) switch from an idle mode to an operating mode.

12 Claims, 4 Drawing Sheets

U.S. PATENT DOCUMENTS

| | | | | |
|---|---|---|---|---|
| 5,365,497 | A * | 11/1994 | Born | 368/230 |
| 5,455,570 | A * | 10/1995 | Cook et al. | 340/3.71 |
| 5,463,374 | A * | 10/1995 | Mendez et al. | 340/442 |
| 5,535,439 | A * | 7/1996 | Katz | 455/117 |
| 5,973,611 | A * | 10/1999 | Kulha et al. | 340/5.62 |
| 6,044,250 | A * | 3/2000 | Kuramatsu et al. | 340/7.4 |
| 6,181,313 | B1 * | 1/2001 | Yokota et al. | 345/100 |
| 6,259,362 | B1 * | 7/2001 | Lin | 340/457 |
| 6,320,514 | B1 * | 11/2001 | Flick | 340/12.28 |
| 6,420,967 | B1 * | 7/2002 | Ghabra et al. | 340/447 |
| 6,696,983 | B2 * | 2/2004 | Tang et al. | 340/989 |
| 6,731,959 | B1 * | 5/2004 | Kumagai et al. | 455/575.3 |
| 6,809,638 | B2 * | 10/2004 | Lin | 340/447 |
| 6,819,229 | B2 * | 11/2004 | Ghabra et al. | 340/426.36 |
| 7,085,585 | B2 * | 8/2006 | Camarillo et al. | 455/550.1 |
| 7,120,473 | B1 * | 10/2006 | Hawkins et al. | 455/575.1 |
| 7,136,678 | B2 * | 11/2006 | Eiden | 455/567 |
| 7,248,201 | B2 * | 7/2007 | Buccinna et al. | 341/176 |
| 2002/0037740 | A1 * | 3/2002 | Noda et al. | 455/550 |
| 2002/0084887 | A1 * | 7/2002 | Arshad et al. | 340/5.61 |
| 2002/0107010 | A1 * | 8/2002 | Witte et al. | 455/418 |
| 2002/0109587 | A1 * | 8/2002 | Attring et al. | 340/426 |
| 2003/0081767 | A1 * | 5/2003 | Montague | 379/433.07 |
| 2003/0117267 | A1 * | 6/2003 | Tang et al. | 340/5.72 |
| 2003/0202087 | A1 * | 10/2003 | Izumi et al. | 348/14.02 |
| 2003/0231131 | A1 * | 12/2003 | Dimig et al. | 341/176 |
| 2004/0036589 | A1 * | 2/2004 | Lin | 340/445 |
| 2004/0108994 | A1 * | 6/2004 | Kato | 345/171 |
| 2004/0125074 | A1 * | 7/2004 | Lin | 345/156 |
| 2004/0125947 | A1 * | 7/2004 | Charlier et al. | 379/433.07 |
| 2004/0192374 | A1 * | 9/2004 | Camarillo et al. | 455/550.1 |
| 2004/0252227 | A1 * | 12/2004 | Seo | 348/375 |
| 2005/0052277 | A1 * | 3/2005 | Rodriguez et al. | 340/5.72 |
| 2005/0134477 | A1 * | 6/2005 | Ghabra et al. | 340/825.72 |
| 2005/0270396 | A1 * | 12/2005 | Miyashita et al. | 348/333.01 |
| 2006/0091997 | A1 * | 5/2006 | Conner et al. | 340/5.64 |
| 2006/0139333 | A1 * | 6/2006 | Park | 345/169 |
| 2006/0202881 | A1 * | 9/2006 | Buccinna et al. | 341/176 |
| 2007/0230915 | A1 * | 10/2007 | Nijjer et al. | 386/107 |
| 2007/0234231 | A1 * | 10/2007 | Lee | 715/788 |

FOREIGN PATENT DOCUMENTS

| | | | |
|---|---|---|---|
| EP | 1 361 324 | A2 | 11/2003 |
| EP | 1 424 658 | A1 | 6/2004 |
| GB | 2378617 | A * | 2/2003 |
| JP | 02170596 | A * | 7/1990 |

* cited by examiner

PORTABLE ELECTRONIC DEVICE FOR CONTROLLING AND MANAGING FUNCTIONS AND/OR DATA OF A VEHICLE

This is a National Phase Application in the United States of International Patent Application No. PCT/EP2005/011292 filed Oct. 20, 2005, the entire disclosure of which is incorporated herein by reference.

FIELD OF THE INVENTION

The present invention relates to a portable electronic device for controlling and managing functions and/or data of a vehicle. The device comprises a casing, for example a non-metal casing, which consists of an upper part which is fixed, for example in a removable manner, on a lower part. Means for wirelessly transmitting and receiving signals are arranged in the casing for personalised communication with means for transmitting and receiving signals of the vehicle in a communication area surrounding the vehicle. A microprocessor unit is provided for processing functions and/or data of the device and of the vehicle, and for checking the transmitting and reception of signals of the means for transmitting and receiving signals of the device. The device further comprises a display screen having a portion which is visible from outside the casing for displaying different menus or data of the device and/or data relating to the vehicle, manual control means for controlling the execution of functions of the microprocessor unit, and a power source for supplying electric power to all the electronic components of the device.

The portable device may be in the form of a key fob or a mobile phone or a wrist watch or any other small object which can be easily carried by a user of the vehicle. The signals transmitted between the vehicle and the device are generally encoded data signals, in particular with an identification code of the device which is personalised to the vehicle to be controlled.

The device relates to controlling and managing functions, functions meaning any process relating to the entry of data into the portable device, in particular for editing or amending a message, setting the time and date, selecting different menus of the device, storing data of the device and of the vehicle, viewing data, or different instructions given to the vehicle for carrying out actions or for checking measurements or parameters of the vehicle. Moreover, it could also include functions for amending or deleting stored data, viewing different menus or stored data, time blocks to be programmed, alarms or other functions.

BACKGROUND OF THE INVENTION

A plurality of embodiments of devices for remote control of a vehicle, such as electronic keys, have been proposed previously. In some known embodiments, a control devices consisted of a conventional mechanical key, in the head of which either a passive or active transponder element, for example, is housed. In other known embodiments, a remote control devices comprise, for example, two control buttons which may be manually pressed so as to lock and unlock the vehicle doors at short range.

When the control device makes a request, some vehicle data may be simultaneously transferred from the vehicle to the remote control device. Transferred data may be displayed on a display screen of the device or stored in the device. Data relating to the vehicle may simultaneously be automatically sent from the vehicle to the personalised control device when a device is near the vehicle.

However, none of the embodiments of known remote control devices has made it possible for a significant number of data or measurements of the vehicle, which are to be managed in the control device, to be transferred on request in a simple manner. Furthermore, only a limited number of functions may be carried out by each control device in the prior art, which poses a drawback.

SUMMARY OF THE INVENTION

The main object of the invention is therefore to eradicate the drawbacks of the prior art by providing a portable electronic device, means of which are simple and easy to use and allow multiple functions and/or data of a vehicle to be controlled and managed.

The invention accordingly relates to a portable electronic device, as mentioned above, characterised in that the manual control means comprise at least one control key having a touch-sensitive pad which is arranged on an inner face of the upper part, which is made of insulating material, of the casing in the vicinity of the visible portion of the display screen so as to be activated in a capacitive manner in an operating mode by a finger of a user placed in a specified region of the sensitive pad whilst also allowing data displayed on the screen to be viewed when the finger is placed on a control key.

An advantage of the portable electronic device according to the invention is that it comprises one or more control keys which can be activated by the finger of a user. A capacitive control keys may be easily produced by laying a metal layer for defining each sensitive pad on an inner face of one of the parts of the casing, and, from an aesthetic point of view, cannot be seen from outside the casing.

As a plurality of control keys are arranged around a visible portion of the display screen, data displayed may always be viewed even when the finger is placed on any one of the control keys. Moreover, in order to facilitate activation of each key, the finger may preferably rest on a bevelled edge of one of the parts of the casing surrounding the control keys so as to be guided in the direction of the sensitive pad of each key to be activated. A plurality of control keys and the display screen may be in an idle mode so as to save power and so as to avoid any mistaken involuntary input when the portable device is manually handled. A plurality of keys and the screen may be switched to an operating mode by pressing a specific control button.

If there are any electronic problems, the portable device advantageously comprises a mechanical key disguised in a position stored in one of the walls of the casing. A cut metal part may be housed and held in a housing arranged inside one of the parts of the casing, and the head of the key outside the housing may be manually gripped without difficulty. When the cut part is in its housing, the head of the key is shaped so as to match the outer contour of the casing and is thus disguised.

BRIEF DESCRIPTION OF THE DRAWINGS

The objects, advantages and features of the portable electronic device will be described in greater detail hereinafter in the description of at least one embodiment of the invention and together with the drawings, in which.

DETAILED DESCRIPTION OF THE ILLUSTRATIVE EMBODIMENTS

Figure 1:
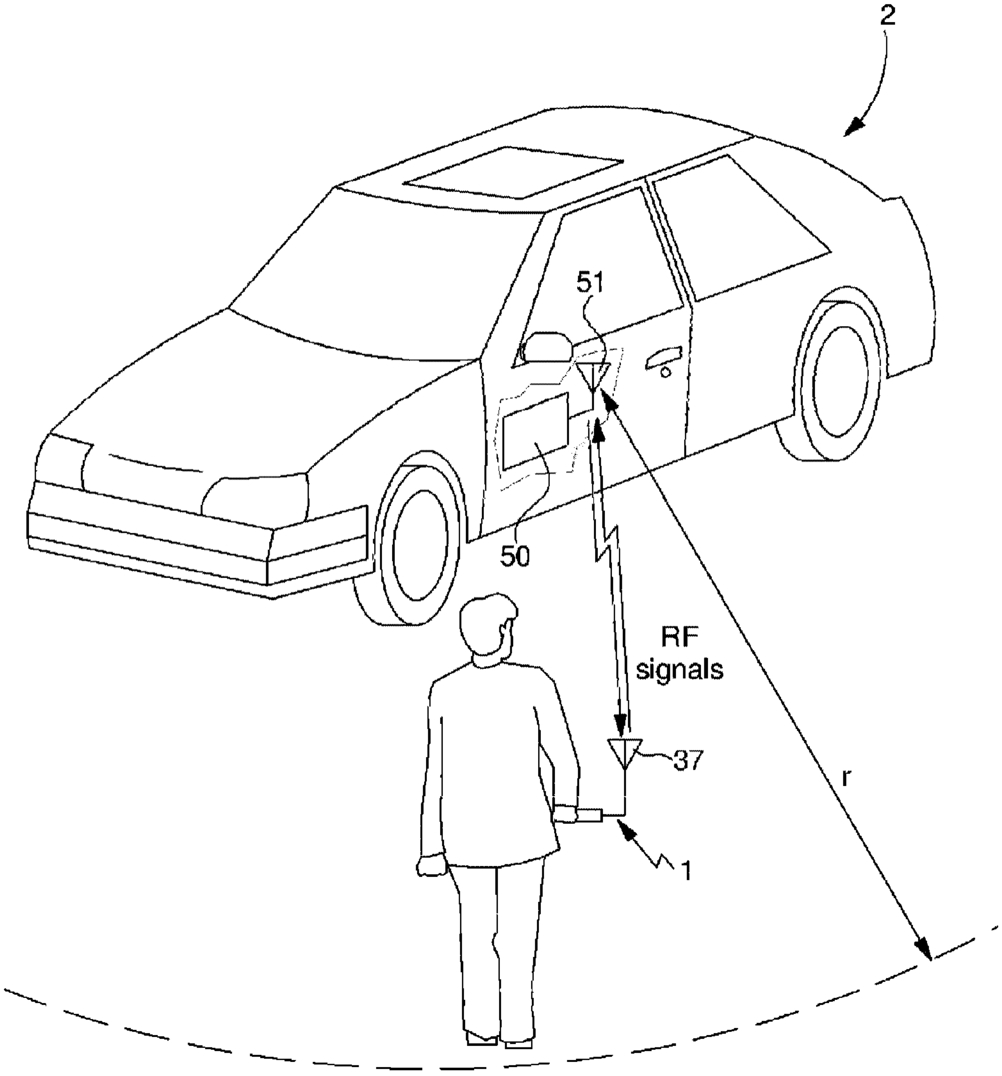
FIG. 1 is a schematic view of a system for wireless transfer of control and/or data signals between a vehicle and a portable electronic device according to the invention.

In the following description, all the elements of the portable electronic device which are well known to a person skilled in the art in this technical field will not be explained in detail. The exemplary and non-limiting embodiment described specifically relates to a portable device in the form of a key fob, which pertains to a portable electronic device for controlling and managing functions and/or data of a vehicle, the device comprising, in a casing having an upper part fixed on a lower part: (1) a means for wirelessly transmitting and receiving signals for personalised communication with means for transmitting and receiving signals of the vehicle in a communication area surrounding the vehicle; (2) a microprocessor unit for processing the functions and/or data of the device and of the vehicle, and for checking the transmission and reception of signals from means for transmitting and receiving signals of the device; (3) at least one display screen having a portion which is visible from outside the casing, the screen being controlled by the microprocessor unit for displaying different menus or data of the device and/or data relating to the vehicle; (4) a manual control means for controlling the execution functions of the microprocessor unit; and (5) a power source for supplying electric power to all the electronic components of the device, wherein the manual control means comprise at least one control key having a touch-sensitive pad which is arranged on an inner face of the upper part, which is made of insulating material, of the casing in the vicinity of the visible portion of the display screen so as to be activated in a capacitive manner in an operating mode by a finger of a user placed in specified region of the sensitive pad whilst also allowing data displayed on the screen to be viewed when the finger is placed on said control key.

Particular embodiments of the recognition system are defined in accordance with the second to tenth embodiments. In accordance with a second embodiment of the present invention, the first embodiment is modified so that the control means comprise a plurality of manual control keys which each have a touch-sensitive pad arranged on the inner face of the upper part of the casing in the vicinity of the visible portion of the display screen, the touch-sensitive pads being of such a size and set apart from one another in such a way that they may be activated separately when a finger of a user is placed in a specified region of a sensitive pad of one of the keys to be activated. In accordance with a third embodiment of the present invention, the second embodiment is further modified so that the control keys are arranged on the inner face of an insulation plate of the upper part of the casing, and wherein the control keys are surrounded by a bevelled edge of the upper part in such a way that the finger is supportingly guided on the bevelled edge in the direction of one of the keys to be activated.

In accordance with a fourth embodiment of the present invention, the second embodiment is modified so that there are six control keys, wherein, in an operating mode, first and second control keys may be manually activated in an editing or amending mode of a specific menu selected by other control keys so as to set date and time data by increasing or decreasing or entering data viewed on the display screen, wherein a third control key may be manually activated for selecting a parking menu to be viewed on the display screen and/or for setting a vehicle parking time in a parking area, wherein a fourth control key may be manually activated for selecting a time menu to be viewed on the display screen and/or for setting the time and the date provided by a time base of the device and for setting an alarm clock, wherein a fifth control key may be manually activated for receiving data or measurements to be viewed on the screen which are sent by the vehicle, the data or measurements relating, in particular, to vehicle defects and being stored in a memory of the device, and wherein a sixth control key may be manually activated for receiving, viewing and/or storing vehicle data relating to mileage, daily mileage, fuel level, the number of miles possible to cover with the remaining fuel, the number of journeys made within a specified time frame, whether the doors are unlocked or locked, whether the windows are open or closed or whether the vehicle lights are on or off.

In accordance with a fifth embodiment of the present invention, the first embodiment is further modified so that the portable device comprises an element for generating vibrations and/or an element for generating acoustic sounds for signalling that vehicle data or measurements have been received, such as a silent alarm, the status of the vehicle or other data or measurements, or for signalling that the vehicle parking time programmed into the device has expired or for signalling an alarm time. In accordance with a sixth embodiment of the present invention, the first embodiment is further modified so that the manual control means comprise two first control buttons arranged in the lower part of the casing and which are to be manually pressed for controlling, in particular, the unlocking and locking of the vehicle doors and/or the opening and closing of the vehicle windows, or the activation of an air-conditioning unit. In accordance with a seventh embodiment of the present invention, the first embodiment is further modified so that the manual control means comprise a second control button arranged in the upper part of the casing, a manual pressure exerted on said second button allowing the control keys and the display screen to switch from an idle mode to an operating mode, and wherein the second manual control button is configured by the microprocessor unit in such a way that if said second manual control button is continuously pressed for longer than a first time limit, the display screen lights up, and if said second control button is continuously pressed for longer than a second time limit which is greater than the first time limit, a control signal is sent to the vehicle to activate an audible alarm or the horn, and/or the vehicle lights.

In accordance with an eighth embodiment of the present invention, the first embodiment is further modified so that the portable device comprises a time base which is connected to the microprocessor unit so as to allow time data to be displayed on the display screen, such as the time and date, and wherein the control keys are configured by the microprocessor unit in such a way that, in an operating mode, different stored menus or data of the device may be selected or viewed. In accordance with an ninth embodiment of the present invention, the eighth embodiment is further modified so that in a menu selected by one of the control keys and displayed on the display screen, a second control button of the manual control means is configured by the microprocessor unit in such a way that data entered in a mode for editing or amending the measurements or data of the device can be validated, activation of specific control keys allowing said viewed measurements or data to be edited or amended. In accordance with a tenth embodiment of the present invention, the first embodiment is further modified so that the display screen is a matrix liquid crystal display or is a two-line segment display, different icons relating to the type of data or measurements viewed appearing selectively on the display screen, and in that the symbols are arranged on the outer face of the upper part of the casing on each corresponding sensitive pad of the control keys to represent the function(s) of each control key.

It should be noted that all identical elements of the portable electronic device described hereinafter in FIGS. 1 to 6 share the same reference numerals. For reasons of simplicity, the description of each element will not be repeated for all the figures.

As can be seen in FIG. 1, the portable electronic device 1 in the form of a key fob is used to control the functions of the vehicle 2 remotely and to view data and measurements or parameters sent by a vehicle. In order to do this, the user of the vehicle 2 carrying a portable electronic device 1 must be in the vicinity of the vehicle in a communication area surrounding a vehicle. A communication area is preferably delimited by a circle, shown in part in FIG. 1, having a radius r around an antenna 51 of means for wirelessly transmitting and receiving signals of an electronic unit 50 of the vehicle.

The portable electronic device 1 is also fitted with means for wirelessly transmitting and receiving signals, only the antenna 37 of a means being shown in FIG. 1. As a result, control or data signals can be communicated between the portable device 1 and the vehicle 2 inside the communication area.

The transmission and reception means of the device and of the vehicle are preferably configured for transmitting radio frequency RF signals comprising a carrier frequency of, for example, 315 MHz or 434 MHz or 868 MHz. A carrier frequency is commonly used in different technical fields for transmitting information between two units at short range. It is possible with such radio frequency RF signals to establish communication between the electronic unit of the vehicle and the portable device up to a distance r therebetween of approximately 15 to 30 m.

If the transmission and reception means of the device and of the vehicle are configured for transmitting low frequency signals, for example comprising a carrier frequency close to 125 kHz, the peak distance for communication between the device and the vehicle is approximately 1.5 to 2 m. Low frequency signals of this type may be used for transmitting a immobilizing function of the vehicle from the portable device.

It is also conceivable for the electronic unit of the vehicle to include means for transmitting low frequency signals having a first transmitting antenna, and means for receiving radio frequency signals having a second receiving antenna. In this case, the portable electronic device must be provided with means for transmitting radio frequency signals having a first transmitting antenna, and means for receiving low frequency signals having a second receiving antenna. It should be noted that the same antenna may be used for both radio frequency signals and low frequency signals.

To establish communication, the vehicle generally transmits a low frequency interrogation signal received by the portable device in such a way that the portable device transmits a radio frequency answer signal. A transmitted answer signal comprises an identification code personalising the device. In this manner, the electronic unit of the vehicle may check whether the portable device is recognised and authorised to communicate before any data or measurements are exchanged. As the principle of recognition of the portable device by the electronic unit of the vehicle is well known in this technical field, as well as the encoding of data or measurements to be transmitted, such as the Manchester code, this subject will not be explained in greater detail.

Figure 2:
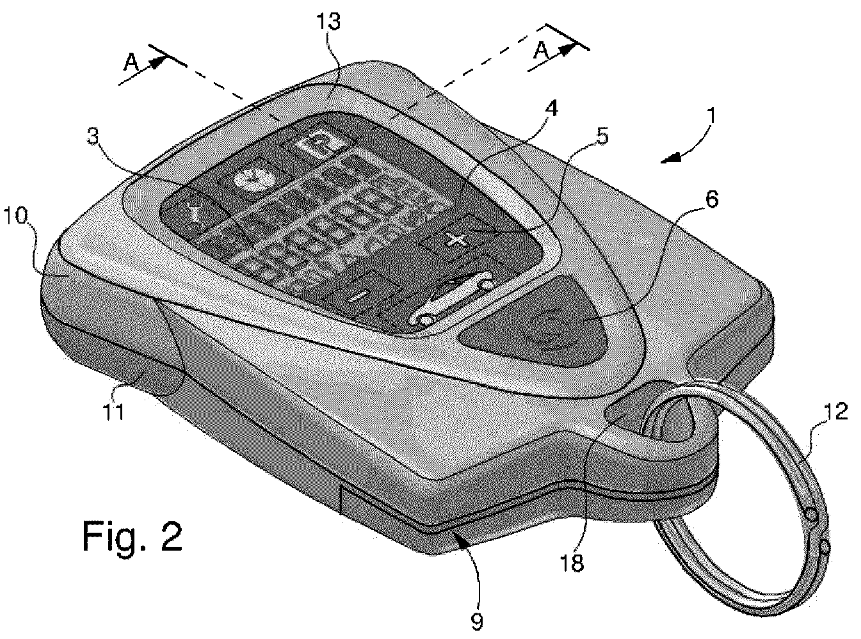
FIG. 2 is a three-dimensional view of the portable electronic device according to the invention, showing the front face with the display screen.

FIG. 2 shows a three-dimensional view of the side of the front face of the portable electronic device 1 which is the object of the invention. The portable electronic device 1 comprises a water-tight casing which may be substantially in the shape of a parallelepiped or in the shape of the car make for which the portable device is intended. A casing is substantially composed of an upper part 10, made of insulating material, which is removably fixed on a lower part 11, also made of insulating material. The way in which these two parts are assembled will be explained hereinafter with reference to FIG. 5.

Inside the casing, the portable device 1 comprises means for transmitting and receiving signals for wireless communication with the vehicle in a communication area surrounding the vehicle, a microprocessor unit for processing the functions and/or data of the device and of the vehicle, and for checking the means for transmitting and receiving signals, and a non-volatile memory, such as EEPROM for storing data. The device further comprises a display screen 3 having a portion which is visible from outside the casing, manual control means 5 and 6 for controlling the execution of functions of the microprocessor unit, and a power source, such as at least one battery, for supplying electric power to all the electronic components of the device.

The display screen 3 is controlled by the microprocessor unit for displaying different menus or data of the device and/or data or measurements or parameters relating to the vehicle. Since the portable electronic device comprises a time base having an oscillator stage which is connected to a crystal resonator for use in clocks and watches, the display screen can display time data, such as the time and date or an alarm time.

A display screen 3 is a matrix liquid crystal display or a two-line display or a display of characters or symbols. A first line or row of the screen is composed of characters or symbols in a 14-segment display, whereas the second line or row of the screen is composed of characters or symbols in a 7-segment display. Different icons relating to the types of function, data or measurements viewed selectively appear on the display screen. Icons are arranged laterally beneath rows of characters.

The portable electronic device 1 may also comprise an element for generating vibrations so the person carrying the device feels a vibration at a programmed alarm time or is alerted that a vehicle parking time has expired or that information has been received and is displayed on the display screen. The portable device 1 may also comprise an element for generating acoustic sounds, such as a piezoelectric electro-acoustic transducer, for signalling sound when different events take place or when a control key 5 is activated or a control button 6 is pressed.

Figure 6:
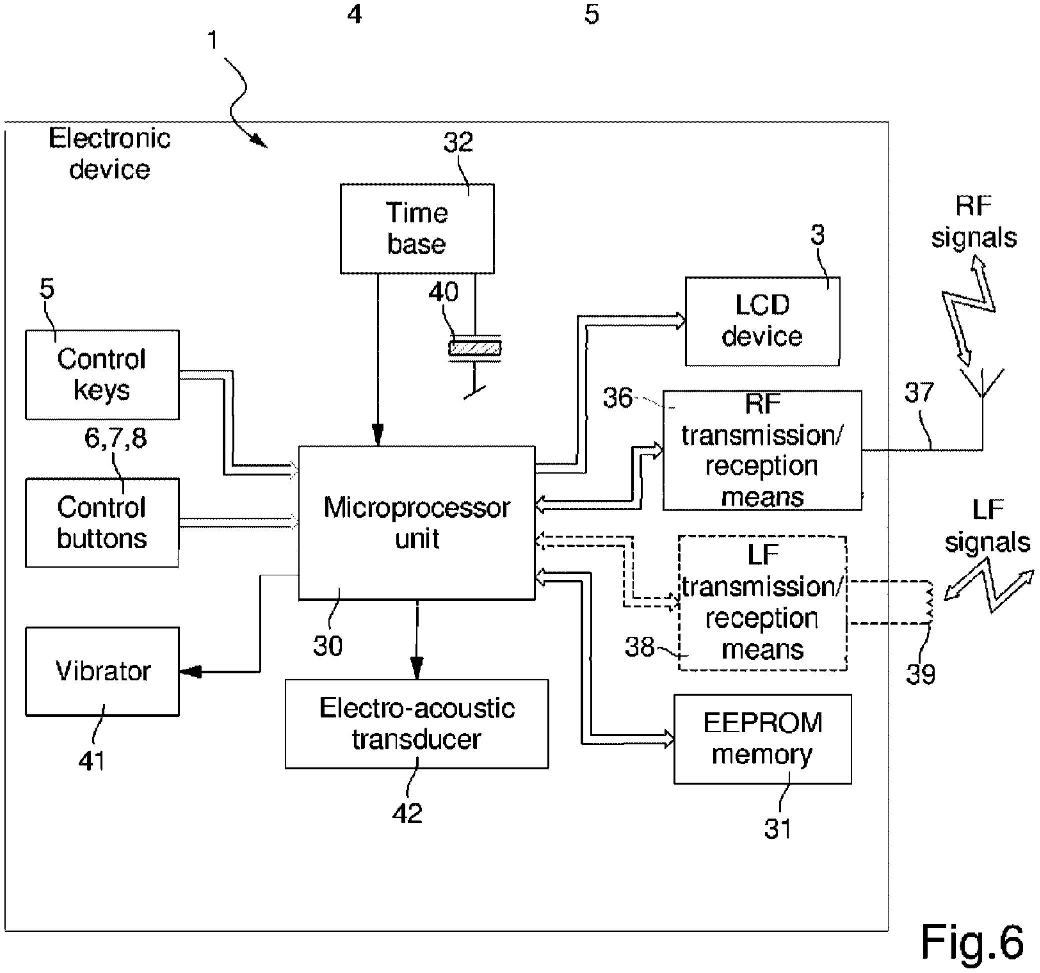
FIG. 6 is a schematic view of different electronic units which form the portable electronic device according to the invention.

It should be noted that the electronic components housed inside the casing of the portable device 1 will be described hereinafter in greater detail with reference to FIG. 6.

As can be seen in FIG. 2, the manual control means comprise a particular number of tactile control keys 5 and a control button 6 arranged, in part, through the upper part 10 of the casing. The tactile keys 5 each have a touch-sensitive pad, shown in FIG. 2 by broken lines. Each sensitive pad is preferably arranged on an inner face of a plate 4 of the upper insulating part 10 of the casing.

The plate 4 is preferably made of the same material as the rest of the upper insulating part 10. However, a plate 4 may also be a glass plate which is fixed to the upper part 10 of the casing and is opaque around the visible portion of the display screen 3.

The sensitive pads of the control keys are of such a size and are set apart from one another in such a way that they may be activated separately by a finger of a user of the portable device 1. When the command keys 5 are in an operating mode, each key may thus be capacitively activated by a finger of a user placed on the plate 4 of the casing in a specified zone of the touch-sensitive pad to be activated.

All the control keys 5 are arranged on the plate 4 around the visible portion of the display screen. The control keys 5 of the plate 4 are surrounded by a bevelled edge 13 of the upper part 10 of the casing. As is shown more clearly in FIG. 3, which shows a cross-section along A-A of FIG. 2, a bevelled edge 13 allows the finger D of a user to be supportingly guided on the bevelled edge in the direction of one of the keys 5 to be activated of the plate 4.

So as to save electric power, the control keys 5 and the display screen 3 are generally in an idle mode when they are not being used or after a specified period of inactivity, for example after five minutes. Furthermore, starting with the control keys 5 in an idle state prevents any mistaken involuntary input when the portable device is manually handled.

A control button 6 is arranged on the same side of the upper part 10 of the casing as the control keys 5. It consists of, for example, a flexible rubber membrane 6, upon which a finger may exert a pressure, a membrane being fixed through the upper part 10 of the casing, and a conventional electric switch inside the casing, not shown.

The control button 6 may be pressed briefly by the finger of a user so as to switch the control keys 5 and the display screen 3 from an idle mode to an operating mode. If a control button 6 is continuously pressed for longer than a first time limit, for example two seconds, the display screen lights up for a programmed period of time. If a control button 6 is continuously pressed for longer then a second time limit which is greater than the first time limit, for example five seconds, control signals are sent from the portable device to the vehicle so as to activate a panic function. A panic function includes, for example, making the vehicle lights turn on and activating an audible alarm or the horn so as to frighten and scare off any attackers or thieves. It is also conceivable for a panic function to be transmitted using other control buttons arranged on the side of the lower part 11 of the casing.

As soon as the control keys 5 and the display screen 3 are in the operating mode, different functions of the portable device 1 may be controlled by activating the control keys 5, of which there are preferably six.

The first and second control keys, represented on the plate 4 by the + and – signs, may be manually activated in an editing or amending mode of a particular menu selected by other control keys. It is thus possible, by means of a first and second control keys, to set time data by increasing or decreasing or entering the data viewed on the display screen.

A third control key, represented on the plate 4 by a parking disc may be manually activated for initially selecting a parking menu shown on the display screen 3. Once a parking menu has been selected, a third control key may be activated during a sufficient time frame, for example approximately two seconds, so as to switch to an editing mode. In a editing mode, the vehicle parking time can be set, in particular in multiples of fifteen minute slots. A parking time is preferably set by using the first and second control keys or, in a simpler configuration of the portable device, by using a third control key. The parking time viewed on the display screen 3 may be validated using the control button 6 or after a specified period of inactivity of the control keys, for example after five seconds.

Once a parking time has been programmed, the microprocessor unit, which is synchronised with the clock signals of the time base, counts down the parking time. A vibration of the device or an audible alarm may alert the person carrying the portable device that the parking time has expired whilst also allowing him to view this information on the display screen 3.

A fourth control key, represented by a clock on the plate 4, may be manually activated for initially selecting a time menu to be viewed on the display screen. If a fourth control key is briefly manually activated, an alarm sub-menu or a date sub-menu or a time sub-menu may be selected. Once a menu or a sub-menu has been selected, a fourth control key may be manually activated during a sufficient time frame, for example approximately two seconds, so as to switch to an editing mode.

In a editing mode with regard to the alarm sub-menu, the alarm can be set or unset, for example using the control button 6, and the alarm time can be set using the first and second control keys by activating the fourth control key so as to switch from setting the hours to setting the minutes. Once set, the alarm may be signalled by a vibration of the portable device or by an acoustic sound.

In the editing mode of the date sub-menu, the day, month and year are set by using the first and second control keys and by manually activating the fourth control key so as to switch from the day to the month and to the year.

In the mode for editing the time sub-menu, the time may be set by using the first and second control keys and by manually activating the fourth control key so as to switch from hours to minutes. It is also conceivable for the time to be set so as to be displayed either in 12 hour form or in 24 hour form. The time to be set may also be sent by the vehicle.

The alarm time, date and time may be validated using the control button 6 or after a specified period of inactivity of the control keys, for example after five seconds.

A fifth control key, represented by a tool, may be manually activated for receiving data or measurements of the vehicle to be viewed on the display screen. The received data or measurements relate, for example, to any possible vehicle defects so as to be stored in a memory of the device. This allows any breakdowns to be easily detected when the vehicle is being serviced or checked in a garage, when data and measurements are transferred from the portable device to a computer workstation at the garage.

By briefly manually activating a fifth control key, different sub-menus, for example relating to the choice of language, time data and to certain events relating to the vehicle may be selected. As previously disclosed, once one of these sub-menus has been selected, a fifth control key may be manually activated during a sufficient time frame, for example, approximately two seconds, so as to switch to an editing mode. The data of a sub-menus is set either using the first and second control keys or by using a fifth control key. The data set may also be validated by using the control button 6 or after a specified period of inactivity of the control keys, for example after five seconds.

Lastly, a sixth control key, represented by the picture of a vehicle, may be manually activated for receiving, viewing and storing vehicle data. Data or measurements relate to mileage, daily mileage, fuel level, the possible number of miles to cover with the remaining fuel, the number of journeys made within a specified time frame, whether the doors are unlocked (open) or locked (closed), whether the windows are open or closed or whether the vehicle lights are on or off, or other information. It should be noted that information regarding whether the doors and windows are open or closed may also be viewed by pressing at least one of the control buttons arranged on the side of the lower part of the casing.

Checking the number of journeys made in a day or the number of miles covered by the vehicle within a specific time frame, which information is stored in the portable device, may be of use, for example, to a car hire company or to a customs service.

Of course, other functions to be carried out may be provided by activating the control keys described above or by means of other control keys on the plate 4 or on the display screen 3.

Figure 4:
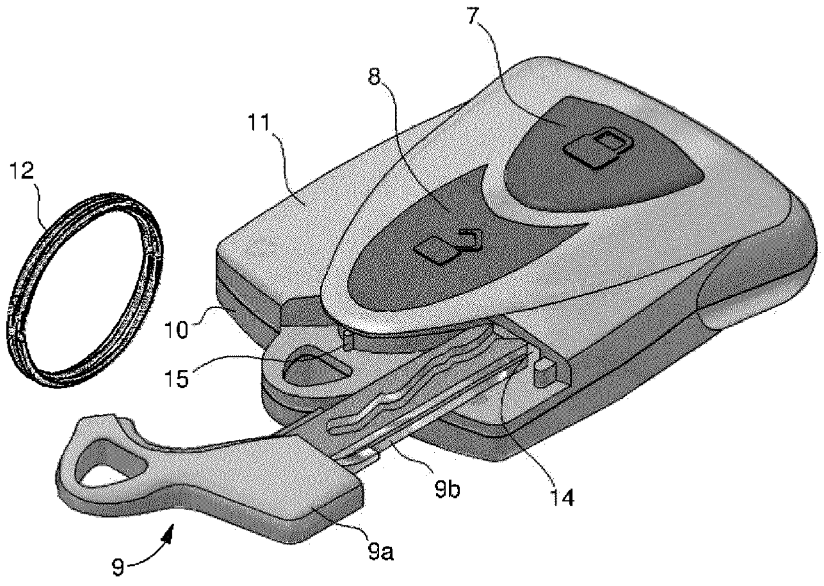
FIG. 4 is a three-dimensional view of the portable electronic device according to the invention, showing the rear face with a mechanical key outside its housing.
Figure 3:
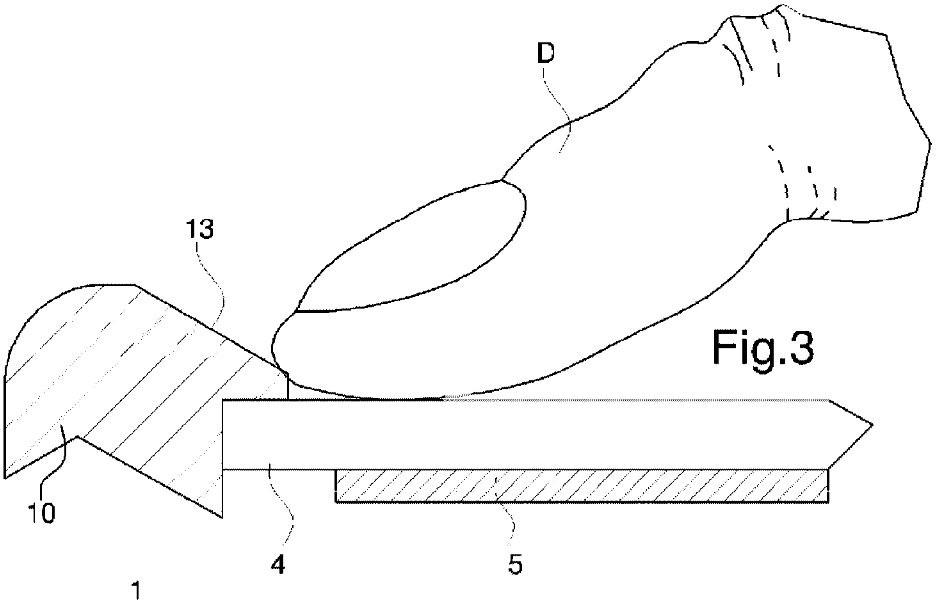
FIG. 3 is a partial cross-section along A-A of the portable device in FIG. 2 showing activation of a tactile control key of the portable device according to the invention.

The portable electronic device 1, shown in FIGS. 2 and 4, is configured in the form of a key fob which is, for example, 60 mm long, 45 mm wide and 15 mm deep. The display screen should have a portion which is visible from the outside and which is as large as possible, for example, 30 mm long and 20 mm wide. To the side of the control button 6, the portable electronic device comprises a lower annular extension 18 of the lower and upper parts. A conventional spring ring 12 may be fixed inside the annular extension 18 for carrying different keys.

If the portable device 1 experiences any electronic problems, for example when the power source does not provide enough supply voltage, a mechanical key 9 of the portable device may be used. A mechanical key 9 may be conventionally used by replacing the electronic functions of the portable device for unlocking or locking the vehicle doors, as well as for starting the vehicle engine.

As is shown clearly in FIG. 4, the mechanical key 9 comprises a cut metal part **9*b* for insertion into a door lock of the vehicle or into an ignition unit of the vehicle, and a head 9*a* made of plastics material for manually gripping a key 9. The cut part 9*b* of the key may be housed and held in a housing 14 of a complementary shape and arranged inside one of the parts of the casing, for example the lower part 11. The head 9*a* of the mechanical key comprises a portion of the side of the cut part 9*b* which is configured so as to contact a wall 15 of a complementary shape of the lower part 11 when the cut part is inserted entirely into the housing 14**.

The head **9*a* of the key must be able to be easily gripped from the outside of the casing so as to remove the cut part 9*b* from its housing 14. A head of the key is preferably made from the same material as the two parts 10, 11 of the casing and is preferably the same colour. It is aesthetically shaped so as to match the outer contour of the casing and thus appear disguised when the cut part 9*b* is entirely housed inside the housing 14 of the casing. Furthermore, a part of the head 9*a* comprises a loop in the annular extension 18 of the lower part 11 and upper part 10** of the casing.

It can also be seen from FIG. 4 that the portable device 1 comprises two control buttons 7 and 8 on the side of the lower part 11 of the casing, which control buttons are respectively represented by a picture of a closed padlock and an open padlock. Each of a plurality of control buttons consists, for example, of a flexible rubber membrane, upon which a finger may exert a pressure, a membrane being fixed through the lower part 11 of the casing, and a conventional electric switch inside the casing. Swithces 7' and 8' are shown in FIG. 5.

When the control button 7 is briefly pressed by a finger of a user, a command to lock all vehicle doors is sent from the portable device 2 to the vehicle, whereas when the control button 8 is pressed, a command to unlock the doors is sent. During a process of unlocking and locking the doors, specific information regarding, for example, the status of the lights, windows and sun roof, is sent from the vehicle to the portable device. Information is viewed on the display screen so the user knows whether the lights are off and whether the windows and the sun roof are open or closed. If the control button 7 is continuously pressed for a sufficient time period, for example approximately two seconds, a command is sent to the vehicle to close the windows and the sun roof. If the control button 8 is continuously pressed for a sufficient time period, for example approximately two seconds, a command is sent to the vehicle to open the windows or the sun roof, either completely or in part.

Of course, by activating the control buttons 7 and 8 it is also possible to control a function for starting or stopping an audible vehicle alarm.

Figure 5:
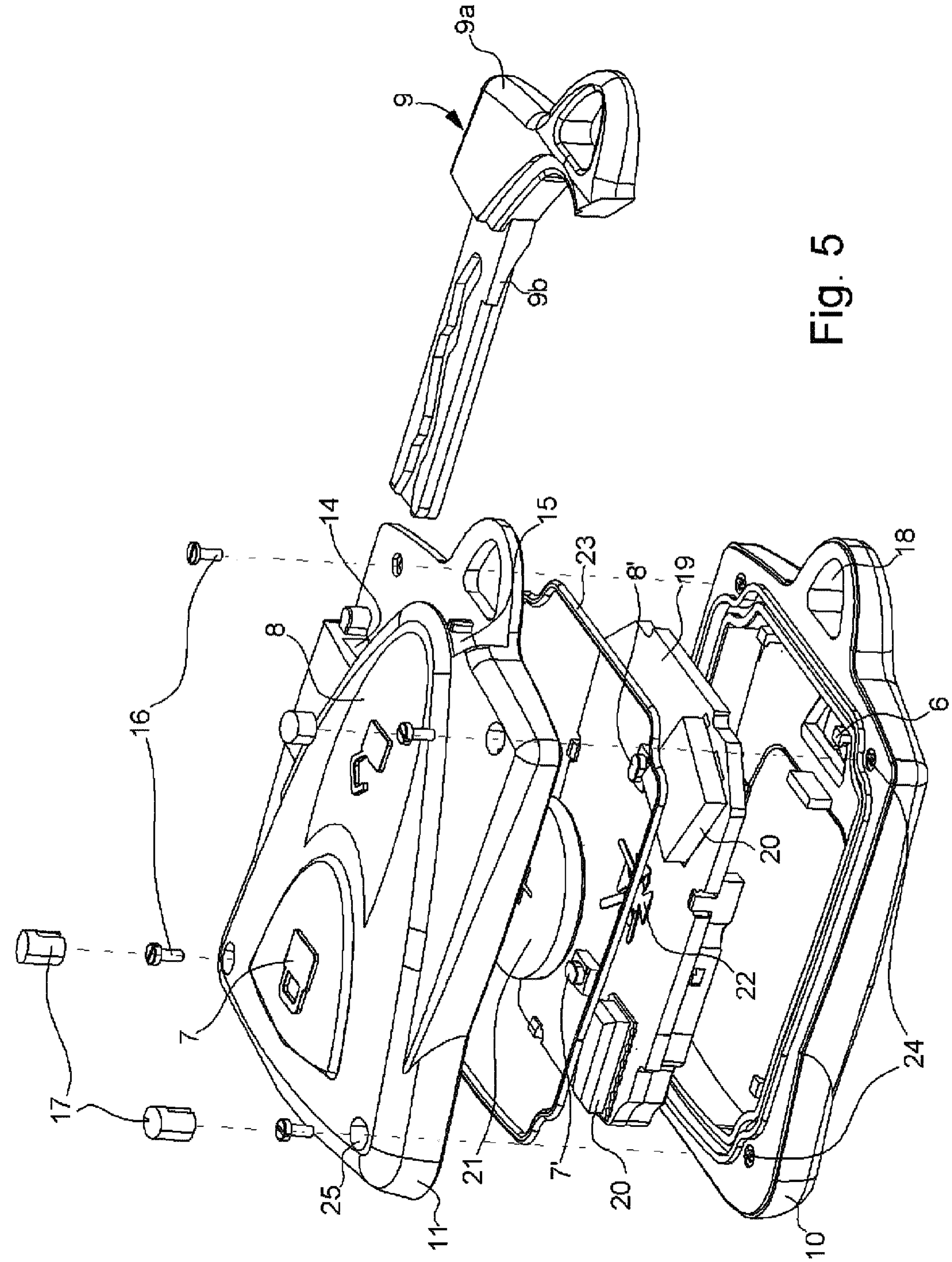
FIG. 5 is an exploded three-dimensional view of the portable electronic device according to the invention showing the different elements of the portable device.

With reference to FIG. 5, the portable electronic device 1 is shown in an exploded view. It can be seen that the lower part 11 and upper part 10 made of plastics material may be assembled one on top of the other by means of a conventional O-ring seal 23 by using a specific number of screws 16, for example four screws. Each screw 16 is inserted through an opening 25 in the lower part 11, and the head of each screw 16 rests against a stop, not shown, inside each opening 25. The screws 16 are then screwed into corresponding internal threads 24 arranged inside the upper part 10 of the casing.

When the casing is closed, plastics material plugs 17 seal the openings 25 above the screws 16. A plurality of plugs 17, which are made of the same material and are the same colour as the lower part 11, are inserted so as to be level with the outer face of the lower part 11.

Inside the casing, a printed circuit board 19 carries, on one side of the lower part 11 of the casing, different electronic circuits 20, such as the microprocessor unit with a non-volatile memory, and the means for transmitting and receiving signals, the two switches 7' and 8' of the buttons 7 and 8 and electric contact blades 22. When the casing is closed, at least one battery 21 contacts a plurality of blades 22 so as to provide electric power to the electronic components of the portable device.

The printed circuit board carries, on the side of the upper part 10 of the casing, the switch of the control button 6, the display screen and the plate on which the sensitive pads of the control keys are arranged, not shown in FIG. 5. However, the plate may be made of the same material as the upper part 10 of the casing, as previously explained.

Normally, all the components or electronic units of the portable device 1, now described with reference to FIG. 6, must be able to be supplied with a voltage provided by the power source of between 2.2 and 3.5 V.

The portable electronic device 1 primarily comprises a microprocessor unit 30 programmed to carry out specific personalised functions relating to data of the device and data and measurements of a vehicle. A microprocessor unit 30 is connected to means for transmitting and receiving radio frequency signals 36 for transmitting RF signals via an antenna 37 for controlling certain functions of a vehicle. When radio frequency signals are received, the electronic unit of the vehicle must recognise the identification code of the device. Once the portable device has been recognised, the functions commanded by the device are carried out inside the vehicle, which sends back specific data or measurements requested by the portable device 1.

A microprocessor unit 30 may also be connected to means for transmitting and receiving low frequency signals 38, shown by broken lines, for transmitting low frequency LF signals via an antenna 39. This type of transmission may be used at a very short distance from the vehicle, in particular to control a function of locking a vehicle and to avoid the use of intermediate relays and forward techniques by unauthorised persons without the knowledge of the person carrying the portable device.

The microprocessor unit 30 may be included in an EM9550 circuit made by EM Microelectronic-Marin SA in Switzerland.

The portable device 1 also comprises a non-volatile memory, such as an EEPROM 31, directly connected to the microprocessor unit 30 so as to store different information relating to functions or data of the device or to data and measurements of the vehicle. An LCD display screen 3 is controlled by the microprocessor unit 30 so as to be able to display different menus, data or measurements, as disclosed hereinbefore. The portable device further comprises a time base 32 which includes an oscillator stage connected to a crystal resonator for use in clocks and watches 40 (32,768 Hz) for synchronising operations of the microprocessor unit and for providing time data which is to be displayed. The control keys 5 and control buttons 6, 7, 8 are connected to the microprocessor unit so as to order it to carry out different functions.

The portable device 1 also comprises an element for generating vibrations 41, such as a vibrator, and/or an element for generating acoustic sounds 42, such as piezoelectric electro-acoustic transducer. A signal indicating that data or measurements of the vehicle have been received, such as a silent alarm, the status of the vehicle or other data or measurements is given by any one of elements 41 and 42 so as to alert a user of the portable device 1. An acoustic or vibratory alert may also be programmed to go off when each key is activated or when each button is pressed.

The vibrator used in this portable device may preferably be the vibrator disclosed in patent EP 0 625 738 B1, the Applicant of which is also the Applicant of the present patent.

The portable electronic device disclosed hereinbefore allows a variety of functions of the device and mainly of the vehicle to be controlled in a simple manner. A plurality of data or measurements of the vehicle may be sent on request from the vehicle to the portable device in such a way that they are stored in the device and are viewed on the display screen. During each exchange of information, a data communication rate of 10 kbd may be reached after a preliminary step of checking an identification code of the authorised portable device.

If the control signals or data signals have not been received by the device or by the vehicle, a plurality of signals are re-sent according to a well known repetition cycle. The same applies when errors occur during transmission of functions, data or measurements.

Based on the description which has just been given, multiple variations of the embodiment of the portable electronic device may be conceived by the person skilled in the art without departing from the scope of the invention defined by the claims. The power source may also be a sun dial or a rechargeable battery which can be recharged by inductive coupling through the plastics material casing. The portable device may come in various forms so as to be easily handled by a user of a portable device. A plurality of information transmission channels may be used by the portable device and the vehicle so as to select the best transmission channel. If the vehicle is fitted with an air-conditioning unit, the portable device is able to activate a unit to heat or cool the passenger compartment of the vehicle to a desired temperature.

What is claimed is:

1. A portable electronic device for controlling and managing functions of a vehicle, or data of a vehicle, or functions and data of a vehicle, wherein the device comprises, in a casing having an upper part fixed on a lower part:

(a)—a first means for wirelessly transmitting and receiving signals for personalised communication with a second means for transmitting and receiving signals of the vehicle in a communication area surrounding the vehicle;

(b)—a microprocessor unit operably connected to process functions of the device and of the vehicle, or to process the data of the device and of the vehicle, or to process the functions and data of the device and of the vehicle, and wherein the microprocessor unit checks transmission and reception of signals from the first means for transmitting and receiving signals of the device;

(c)—at least one display screen having a portion that is visible from outside the casing, wherein the at least one display screen is controlled by the microprocessor unit so that the at least one display screen displays different menus or data of the device, or data relating to the vehicle, or different menus or data of the device and data relating to the vehicle;

(d)—a manual control means for controlling the execution of functions of the microprocessor unit, wherein the manual control means comprise at least one control key having a touch-sensitive pad, arranged on an inner face of the upper part of the casing in a vicinity of the visible portion of the display screen so as to be activated in a capacitive manner in an operating mode by a finger of a user placed in a specified region of the touch-sensitive pad, while also allowing data displayed on the at least one display screen to be viewed when the finger is placed on the at least one control key, wherein the upper part is made of insulating material, and wherein a manual control button is arranged in the upper part of the casing, a manual pressure exerted on said manual control button allowing the at least one control key and the at least one display screen to switch from an idle mode to an operating mode; and (e)—a power source operably connected to supply electric power to all electronic components of the device, wherein the manual control button is configured by the microprocessor unit so that when the manual control button is continuously pressed for longer than a first time limit, the display screen lights up, and when the manual control button is continuously pressed for longer than a second time limit that is greater than the first time limit, a control signal is sent to the vehicle to activate an audible alarm or a horn, or lights of the vehicle, or to activate the audible alarm or the horn and the lights of the vehicle.

2. The portable device according to claim 1, wherein the manual control means further comprises a plurality of manual control keys that each have a touch-sensitive pad arranged on the inner face of the upper part of the casing in the vicinity of the visible portion of the display screen, wherein the touch-sensitive pads are of such a size and set apart from one another so that the plurality of manual control keys may be activated separately when a finger of a user is placed in a specified region of a sensitive pad of one of the keys to be activated.

3. The portable device according to claim 2, wherein the plurality of manual control keys are arranged on an inner face of an insulation plate of the upper part of the casing, and wherein the plurality of manual control keys are surrounded by a bevelled edge of the upper part so that the finger is supportingly guided on the bevelled edge in a direction of one of the plurality of manual control keys to be activated.

4. The portable device according to claim 2, wherein there are six control keys, wherein, in an operating mode, first and second control keys may be manually activated in an editing or amending mode of a specific menu selected by other control keys so as to set date and time data by increasing or decreasing or entering data viewed on the display screen, wherein a third control key may be manually activated for selecting a parking menu to be viewed on the display screen and/or for setting a vehicle parking time in a parking area, wherein a fourth control key may be manually activated for selecting a time menu to be viewed on the display screen and/or for setting the time and the date provided by a time base of the device and for setting an alarm clock, wherein a fifth control key may be manually activated for receiving data or measurements to be viewed on the screen which are sent by the vehicle, the data or measurements relating, in particular, to vehicle defects and being stored in a memory of the device, and wherein a sixth control key may be manually activated for receiving, viewing and/or storing vehicle data relating to mileage, daily mileage, fuel level, the number of miles possible to cover with the remaining fuel, the number of journeys made within a specified time frame, whether the doors are unlocked or locked, whether the windows are open or closed or whether the vehicle lights are on or off.

5. The portable device according to claim 1, wherein the portable device further comprises:

(f) a first element for generating vibrations or a second element for generating acoustic sounds, or a third element for generating vibrations and for generating acoustic sounds, in order to signal that vehicle data or measurements have been received by the portable device, or to signal a status of the vehicle or other data or measurements, or to signal that a vehicle parking time programmed into the portable electronic device has expired, or for signalling an alarm time.

6. The portable device according to claim 1, wherein the manual control means further comprises two first control buttons arranged in the lower part of the casing and that, when manually pressed, control unlocking and locking of doors of the vehicle doors, or opening and closing of windows of the vehicle, or the unlocking and locking of the doors of the vehicle doors and the opening and closing of the windows of the vehicle, or activation of an air-conditioning unit of the vehicle.

7. The portable device according to claim 2, wherein the portable device further comprises (f) a time base that is connected to the microprocessor unit so as to allow time data to be displayed on the display screen, and wherein the plurality of manual control keys are configured by the microprocessor unit so that, in an operating mode, different stored menus or data of the portable device are selectable or viewable.

8. The portable device according to claim 7, wherein, in a menu selected by one of the plurality of manual control keys and displayed on the display screen, a second control button of the manual control means is configured by the microprocessor unit so that data entered in a mode for editing or amending measurements or data of the portable device is validatable, and activation of specific control keys allows viewed measurements or data to be edited or amended.

9. The portable device according to claim 2, wherein the at least one display screen is a matrix liquid crystal display or is a two-line segment display, wherein different icons relating to a type of data or measurements viewed appear selectively on the at least one display screen, and wherein symbols are arranged on an outer face of the upper part of the casing on each corresponding sensitive pad of the plurality of manual control keys to represent one or more functions of each manual control key.

10. The portable device according to claim 5, wherein the signal is a silent alarm.

11. The portable device according to claim 5, wherein the time data comprises time and date.

12. A portable electronic device for controlling and managing functions of a vehicle, or data of a vehicle, or functions and data of a vehicle, wherein the device comprises, in a casing having an upper part fixed on a lower part:

(a) a first means for wirelessly transmitting and receiving signals for personalised communication with a second means for transmitting and receiving signals of the vehicle in a communication area surrounding the vehicle;

(b) a microprocessor unit operably connected to process functions of the device and of the vehicle, or to process the data of the device and of the vehicle, or to process the functions and data of the device and of the vehicle, and wherein the microprocessor unit checks transmission and reception of signals from a third means for transmitting and receiving signals of the device;

(c) at least one display screen having a portion that is visible from outside the casing, wherein the at least one display screen is controlled by the microprocessor unit so that the at least one display screen displays different menus or data of the device, or data relating to the vehicle, or different menus or data of the device and data relating to the vehicle;

(d) manual control means for controlling the execution of functions of the microprocessor unit; and (e) a power source operably connected to supply electric power to all electronic components of the device, wherein the manual control means comprises a plurality of manual control keys that each have a touch-sensitive pad arranged on an inner face of the upper part of the casing in the vicinity of the visible portion of the display screen so as to be activated in a capacitive manner in an operating mode by a finger of a user placed in a specified region of each touch-sensitive pad, respectively, while also allowing data displayed on the at least one display screen to be viewed when the finger is placed on the plurality of manual control keys, and wherein the upper part is made of insulating material, and wherein the touch-sensitive pads are of such a size and set apart from one another so that the plurality of manual control keys may be activated separately when a finger of a user is placed in a specified region of a sensitive pad of one of the plurality of manual control keys to be activated, wherein the plurality of manual control keys include six control keys, wherein, in an operating mode, first and second control keys are manually activatable in an editing or amending mode of a specific menu selected by other control keys so as to set date and time data by increasing or decreasing or entering data viewed on the display screen, wherein a third control key is manually activatable for selecting a parking menu to be viewed on the display screen or for setting a vehicle parking time in a parking area, for selecting the parking menu to be viewed on the display screen and for setting the vehicle parking time in the parking area, wherein a fourth control key is manually activatable for selecting a time menu to be viewed on the display screen or for setting the time and the date provided by a time base of the device and for setting an alarm clock, or for selecting the time menu to be viewed on the display screen and for setting the time and the date provided by the time base of the device and for setting the alarm clock, wherein a fifth control key is manually activatable for receiving data or measurements to be viewed on the screen that are sent by the vehicle, wherein the data or measurements relate to vehicle defects and are stored in a memory of the portable electronic device, and wherein a sixth control key is manually activatable for receiving, viewing or storing, or for receiving, viewing and storing, vehicle data relating to mileage, daily mileage, fuel level, the number of miles possible to cover with remaining fuel, the number of journeys made within a specified time frame, whether doors are unlocked or locked, whether windows are open or closed, or whether lights of the vehicle are on or off.

* * * * *